Sept. 3, 1963            W. P. MASON            3,102,420
HIGH STRAIN NON-LINEARITY COMPENSATION
OF SEMICONDUCTIVE SENSING MEMBERS
Filed Aug. 5, 1960
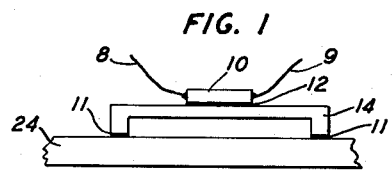
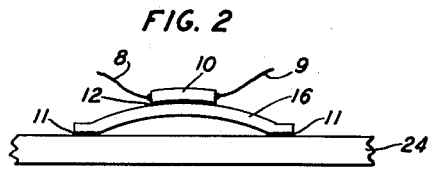
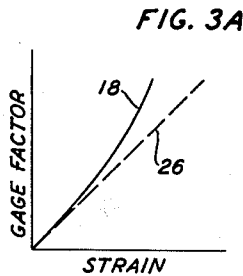
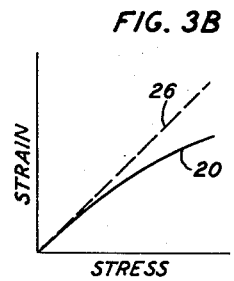
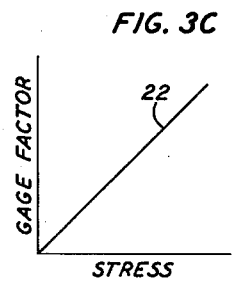
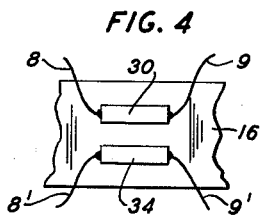
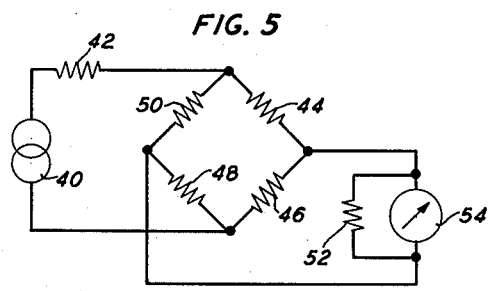
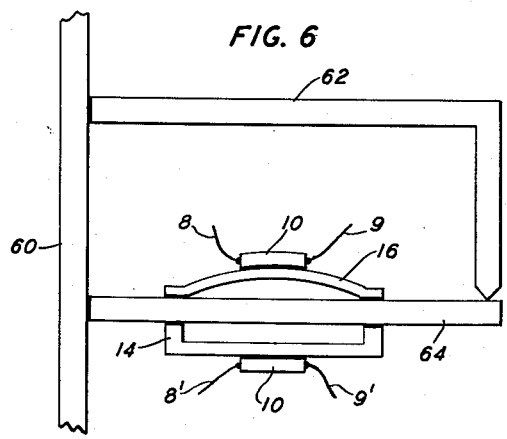
INVENTOR
W. P. MASON
BY
H. O. Wright
ATTORNEY

United States Patent Office 3,102,420
Patented Sept. 3, 1963

3,102,420
HIGH STRAIN NON-LINEARITY COMPENSATION OF SEMICONDUCTIVE SENSING MEMBERS
Warren P. Mason, West Orange, N.J., assignor to Bell Telephone Laboratories, Incorporated, New York, N.Y., a corporation of New York
Filed Aug. 5, 1960, Ser. No. 47,692
4 Claims. (Cl. 73—88.5)

This application relates to strain gauges. More particularly, it relates to strain gauges employing strain sensing members of piezoresistive semiconductive materials.

It is highly desirable that strain gauges provide sufficient signal voltage (that is, from approximately one to five volts) to operate recording devices without it being necessary to employ intermediate amplifying means. This can be accomplished at high strain amplitudes (up to $10^{-3}$) with strain gauges employing piezoresistive strain sensing members of semiconductive material. However, in many instances the response of the strain sensing members at high strain values will be found to depart to an objectionable degree from linearity. For example, while p-type strain gauges have been found to have responses which remain linear within one percent up to strains in the gauge of $2.4 \times 10^{-5}$, when the strains were increased to $5 \times 10^{-4}$ the gauges departed as much as twenty percent or more from linearity.

As will be described in more detail hereinunder, more nearly linear responses can be obtained by mounting the strain sensing members on "saddle" members which are in turn mounted on the member the strain of which is to be measured.

The "saddle" member may pre-stress the sensing member or it may modify the stress imparted to the saddle itself before application to the sensing member, the arrangement in each instance being designed to compensate for nonlinear response of the sensing member. Obviously, a saddle member can both pre-stress the sensing member and modify the stress imparted to the saddle before application to the sensing member, the two effects combining in such a way as to reduce non-linearity in the response of the sensing member.

It is, accordingly, a primary object of the present invention to substantially reduce the non-linearity of the response of piezoresistive semiconductive strain sensing members when subjected to high strain amplitudes.

It is a further object to increase the range of strains over which gauges employing piezoresistive semiconductive strain sensing members can be employed.

It is a still further object to eliminate the necessity of employing intermediate amplifiers in strain gauge assemblies.

The above and related objects of the invention are realized, as mentioned above, by employing a saddle-type mounting for the strain sensing elements. The mounting may pre-stress the strain sensing member in the opposite sense from the strain to be measured. Also, by employing in conjunction two members of opposite conductivity type with appropriately arranged circuit connections, linearity may be improved. Furthermore, by mounting the strain sensing member on a curved metallic saddle member to which the stress is initially applied, the stress as applied to the sensing member is modified to compensate for the non-linearity in the response of the sensing member. Combinations of two or more of the above described artifices may, of course, also be employed.

The above and other features, objects and advantages of the invention will become apparent from a perusal of the detailed description of illustrative arrangements of the invention given hereinunder.

Of interest in connection with this application is my copending application Serial No. 814,288, filed May 19, 1959, which matured as United States Patent No. 3,034,-345, granted May 15, 1962, in which non-linear sensitivity response of piezoresistive semiconductive strain sensing members with changing temperature is compensated by employing one or more electrical terminal resistors having complementary characteristics with changing temperatures. Also of interest is my copending application Serial No. 47,693, filed August 5, 1960, concurrently with the present application, in which last mentioned copending application artifices for increasing the signal-to-noise ratio and stability with temperature changes of piezoresistive semiconductive strain sensing members and circuits by heavily "doping" the sensing members with a significant impurity are described. Irradiation by fast neutrons and diffusion of gold as an impurity are also disclosed in the last mentioned application. Both of my above-mentioned copending applications are assigned to the same assignee as the present application.

In the drawings:

FIG. 1 illustrates a first form of saddle mounting for a piezoresistive sensing member of the invention;

FIG. 2 illustrates a second form of saddle mounting for a piezoresistive sensing member of the invention;

FIGS. 3A, 3B and 3C are curves illustrating the compensating effect of the mounting of FIG. 2;

FIG. 4 illustrates the positioning of two sensing members on a single saddle mounting;

FIG. 5 is an electrical schematic diagram of a complete circuit in which the variations of resistance with strain of the sensing members operate an indicating device; and FIG. 6 is a so-called "bimorph" arrangement of a pair of sensing members each mounted on its own individual saddle.

Like members appearing in two or more of the figures are assigned the same respective designation numbers in each figure.

In more detail in FIG. 1, member 24 represents a member in which the strain is to be measured.

Member 10 is a strain sensing member of a piezoresistive semiconductive material, such as silicon or germanium. Conductive leads 8 and 9 are electrically connected to the respective ends of sensing member 10, as shown.

Normally, sensing members such as member 10 are "doped," that is, they contain a significant impurity in an amount sufficient to cause the entire member to be either of p-type conductivity or of n-type conductivity, depending upon the specific significant impurity present.

This matter of "doping" is discuseed in some detail in the second of my above-mentioned copending applications, being filed concurrently with this application, which copending application is directed to several artifices including the use of very heavy "doping" to reduce fluctuation noise and to provide an increased signal-to-noise ratio where very small values of strain are to be measured.

The information contained in this copending application relating to "doping" is hereby incorporated by reference in the present application. The degree or amount of "doping" for sensing members to be used in arrangements of the present application to measure high strain levels, however, will usually be less than the maximum for the purposes of the above-mentioned application directed to increasing the signal-to-noise ratio. For example, "doping" for the purposes of the present application can be in the order of $10^{18}$ to $10^{19}$ impurity atoms per cubic centimeter.

Interposed between strain sensing member 10 and member 24 is a member 14 which for obvious reasons will be referred to throughout this application as a "saddle" member. As illustrated in FIG. 1, saddle member 14 should be several times as long as sensing member 10 and the latter should be centrally located on the saddle member 14 so that any localized stresses arising near the ends of member 14 will not contribute to the stress being transmitted to the sensing member. Member 10 is firmly secured to saddle 14 by a strongly adhesive material of good electrical insulating properties such as epoxy resin. Member 14 is firmly secured to member 24 either by epoxy resin or, alternatively, it can be spot-welded or soldered, if both members are of metal.

In the form shown in FIG. 1, "saddle" member 14 will usually be employed to impose a pre-stressed condition on sensing member 10 the nature and magnitude of which will depend upon the conductivity type of member 10 and the nature and range of strain to be measured, as will be discussed in more detail hereinbelow.

For example, for measuring tensile strains in member 24 up to magnitudes in the order of $10^{-3}$ or higher, an n-type conductivity sensing member of semiconductive material should be employed and should be pre-stressed by member 14 by a compressive stress of approximately $2.5 \times 10^{-3}$, for example. To effect such stressing, the thermal coefficients of expansion of member 10 and member 14 should differ appropriately so that if both members are heated to a relatively high temperature, and member 10 is then firmly secured to member 14 while the members are at that high temperature, subsequent cooling to room temperature will cause compressive stressing of member 10 to the desired magnitude. By way of examples, where operation at or near normal room temperatures only is anticipated, member 10 is of silicon or germanium, member 14 may be of duralumin (4 percent copper, 96 percent aluminum) and members 10 and 14 should be heated to 125° C. before being fastened together. If, however, operation at considerably higher than normal room temperatures is anticipated, member 14 may be of molybdenum and members 10 and 14 should be heated to 780° C. before being fastened together. Operation up to several hundred degrees above room temperature will then be possible without loss of the "pre-stress" in the member 10.

By way of further example, for measuring compressive strains in member 24 up to magnitudes in the order of $10^{-3}$ or higher, a p-type conductivity sensing member should be employed and should be pre-stressed by member 14 by a tensile stress of approximately $2.5 \times 10^{-3}$, for example. To effect this stressing, member 14, for example, can be of duralumin, and members 10 and 14 can be cooled to minus 100° C. before being firmly secured to each other. Subsequent heating to room temperature will then cause member 10 to be stressed in tension to the appropriate magnitude.

By the above described pre-stressing process the range of strains which can be measured and the gauge factor of the device will both be substantially doubled while departure from linearity at high stress will be substantially reduced, that is, to approximately one half that otherwise to be anticipated.

The gauge factor is the ratio of the change of resistance of the piezoresistive sensing member (resulting from the application of the strain to be measured) to the product of the original resistance of the sensing member (before application of the strain to be measured) multiplied by the strain.

To obtain an indication of the magnitude of the strain, the leads 8 and 9 connected to opposite ends of member 10, respectively, are connected into a circuit including at least a source of electrical energy and an indicator, such as a voltmeter, so that variation of the resistance of the sensing member produces a change in the reading of the indicator.

While a simple series circuit, as described above, is adequate and sufficient for some purposes, it is usually considered preferable to employ a circuit including a bridge, the sensing element being electrically connected to constitute one arm of the bridge. A preferred circuit of the latter type is shown in schematic diagram form in FIG. 5 and comprises a bridge having the four resistive arms 44, 46, 48 and 50, respectively. One of these, for example resistor 50, represents the resistance of the sensing member such as that of member 10 of FIG. 1. With no strain on the member 24, the other resistances of the bridge are adjusted until the bridge is electrically in a balanced condition. A source of electrical energy 40 in series with a resistor 42 is connected across one diagonal of the above-mentioned bridge and an indicator 54, which may, for example, be a voltmeter which is preferably shunted by resistor 52, is connected across the other diagonal of the bridge. When the bridge is balanced the indicator will, of course, produce no indication.

When, however, a strain in member 24 of FIG. 1 is transmitted through saddle member 14 to sensing member 10, its resistance will change in proportion to the strain, thus unbalancing the bridge of the circuit of FIG. 5 (assuming resistor 50 represents the resistance of member 10) and producing a reading on indicator 54 which will indicate the magnitude of the strain.

Either one or both of the resistors 42, 52 may be of a material the characteristics of which vary with temperature in such manner that variations in the sensitivity of the circuit with temperature are compensated, as described in detail and claimed in applicant's above-mentioned co-pending application, Serial No. 814,288, filed May 19, 1959.

In FIG. 2 a second form of saddle mounting 16 for a piezoresistive semiconductive sensing member 10 is illustrated and differs from that of FIG. 1 in that member 16 is curved and sensing member 10 is firmly affixed to member 16 at room temperature so that no pre-stressing of member 10 is introduced. As illustrated in FIG. 2, the saddle member 16 should be several times as long as the stress sensing member 10 and the radius of curvature of member 16 should be somewhat greater than the arc subtended by the member. In the specific case illustrated in FIG. 2, the ratio of the arc subtended to the radius of curvature is nine-thirteenths. As is also illustrated in FIG. 2, the sensing element 10 is located centrally on saddle member 16. The effect of the curvature is to produce stresses in the saddle member which at low magnitudes are substantially linear but at higher magnitudes depart more and more from a linear characteristic in such manner as to compensate for the non-linear characteristics of the member 10. In a further form, saddle member 16 can be arranged to also impart a definite pre-stress to member 10 substantially as described for FIG. 1.

Considering now the curves of FIGS. 3A, 3B and 3C, curve 18 of FIG. 3A represents a typical response characteristic of a typical sensing member as compared with a rigorously linear response illustrated by the dash-line 26. Curve 20 of FIG. 3B represents a typical response of (or variation of strain with stress for) the central portion of a curved saddle member such as member 16 of FIG. 2 as compared with the rigorously linear response represented by dash-line 26. Combining the responses represented by curves 18 and 20 of FIGS. 3A and 3B yields the substantially linear response represented by line 22 of FIG. 3C. Thus it is apparent that by appropriately proportioning and shaping the curved member 16 of FIG. 2, a virtually linear response will be obtained when member 10 of FIG. 2 is connected as an arm, for example arm 50, in the bridge of a circuit such as that of FIG. 5.

In FIG. 4 a further arrangement of the invention is illustrated and comprises two piezoresistive semiconductive strain sensing members 30 and 34, respectively, mounted side by side and firmly affixed to saddle member 16. One sensing member, for example member 30, is of p-type conductivity and the other, for example member 34, is of n-type conductivity. Each is provided with a pair of electrical leads 8, 9 and 8′, 9′ respectively connected to opposite ends of their associated members as shown. When connected into the bridge circuit of FIG. 5, members 30 and 34 should constitute adjacent arms of the bridge as, for example, arms 50 and 48, respectively, in which case the deviations from linearity at high strain values for member 30 will be in part compensated by oppositely directed similar deviations from linearity of member 34. Thus the correction, if any, required to be introduced by saddle 16, as described above in connection with FIG. 2 and FIGS. 3A, 3B and 3C, will be substantially reduced.

In FIG. 6 a still further arrangement of the invention is shown and employs a modified structure of the general type known as a "bimorph" structure. In FIG. 6, two sensing members 10 are mounted on saddles 14 and 16, respectively, on the under and upper surfaces of a flexible arm 64. A member 60, the compressive strain of which is to be measured supports the left end of member 64. It also supports the left end of a rigid L-shaped contacting arm member 62 at a distance above the point of support of member 64. The right end of arm 62 contacts the right end of flexible member 64 so that compressive strain in member 60 is transmitted by arm 62 to flex member 64 downwardly. This of course results in tensing saddle 16 and through it the upper sensing member 10 and compressing saddle 14 and through it the lower sensing member 10.

As described in connection with FIG. 2, the curved saddle member 16 is proportioned to compensate for non-linearity of upper sensing member 10 at high strain values.

As described in connection with FIG. 1, saddle 14 provides a pre-stressed condition in tension for lower sensing member 10 which extends its normal range of substantially linear response.

Furthermore, by connecting the two sensing members, that is, upper member 10 and lower member 10 (of FIG. 6) into adjacent arms of the bridge circuit of FIG. 5, for example, so that they constitute arms 50 and 48 respectively of the bridge circuit, a further compensation for their respective tendencies toward non-linear response at higher strain levels is realized. Finally, one member 10 can be of p-type conductivity and the other of n-type conductivity to effect a still further compensation for non-linear response at higher strain levels.

The arrangement of FIG. 6 is readily adapted to measure tensile strain in member 60 by mounting arm 62 closer to arm 64 so that for no strain in member 60 arm 64 is deflected downwardly by an appreciable amount. When member 60 is then placed under tensile strain, arm 64 will tend to return toward its undeflected position. In such an arrangement the associated bridge circuit of FIG. 5 should, of course, be balanced with arm 64 deflected to its position corresponding to no strain in member 60.

Numerous and varied modifications and rearrangements of the specific illustrative embodiments described hereinabove, within the spirit and scope of the invention, can readily be devised by those skilled in the art. No attempt has been made to exhaustively illustrate all such possibilities.

What is claimed is:

1. A strain gauge comprising two strain sensing members of piezoresistive semiconductive material, the members being placed adjacent each other and firmly attached to a surface of a member the strain of which is to be measured, one sensing member being of p-type conductivity, the other sensing member being of n-type conductivity, and an electrical circuit including a bridge circuit and an indicating device, one sensing member being connected to form one arm of the bridge circuit, the other sensing member being connected to form an adjacent arm of the bridge, whereby the resistances of the sensing members will change in opposite senses in response to strains imposed upon them and will compensate at higher strain values for the non-linear responses of each other.

2. The strain gauge of claim 1 in which the strain sensing members are mounted on a saddle member, the saddle member being mounted on the member whose strain is to be measured.

3. The strain gauge of claim 2 in which the saddle is curved so that the strain transmitted by the saddle to the piezoresistive sensing members increases less rapidly at larger values than the strain in the member whose strain is to be measured.

4. The combination comprising a flexible arm, a pair of piezoresistive members, a saddle member for each piezoresistive member, the saddle members each having a length several times that of their respective associated piezoresistive members, each piezoresistive member being firmly attached to the central portion of its associated saddle member, the saddle members being firmly attached to opposite sides of the flexible arm, each saddle member modifying the effective stress on its associated piezoresistive member to correct for non-linear characteristics of its associated piezoresistive member.

References Cited in the file of this patent

UNITED STATES PATENTS

| | | |
|---|---|---|
| 2,316,975 | Ruge | Apr. 20, 1943 |
| 2,836,738 | Crownover | May 27, 1958 |
| 2,981,912 | Giovanni | Apr. 25, 1961 |

OTHER REFERENCES

"Brush Bulletin," volume 1, No. 11, Aug. 1, 1946. (Copy in 73–88.5.)

Perry, C. C.: "The Strain Gage Primer," McGraw-Hill, 1955, p. 247.